W. H. LUHRS.
VALVE.
APPLICATION FILED APR. 23, 1915.

1,184,365.

Patented May 23, 1916.

Witnesses
W. K. Ford
James P. Barry

Inventor
William H. Luhrs

By Whittemore Hulbert & Whittemore
Attorneys

UNITED STATES PATENT OFFICE.

WILLIAM H. LUHRS, OF DETROIT, MICHIGAN.

VALVE.

1,184,365.  Specification of Letters Patent.  Patented May 23, 1916.

Application filed April 23, 1915. Serial No. 23,316.

*To all whom it may concern:*

Be it known that I, WILLIAM H. LUHRS, a citizen of the United States of America, residing at Detroit, in the county of Wayne and State of Michigan, have invented certain new and useful Improvements in Valves, of which the following is a specification, reference being had therein to the accompanying drawings.

The invention relates to valves more particularly designed for use as air valves, and comprises the novel construction as hereinafter set forth.

Figure 1:
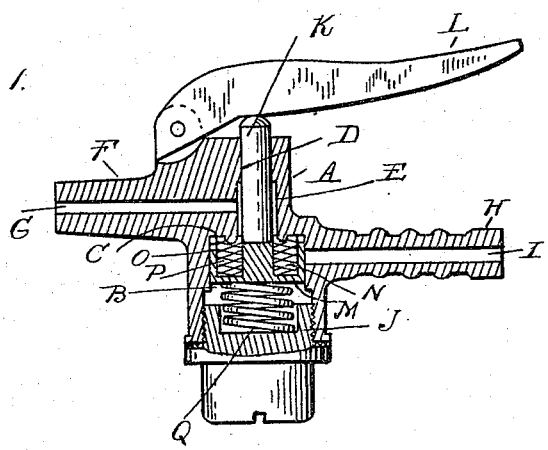
Figure 2:
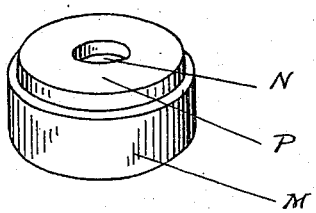

In the drawings: Figure 1 is a longitudinal section; and Fig. 2 is a perspective view of the valve disk.

A is the valve casing, which is formed with the cylindrical recess or chamber B therein, having on its bottom face an annular valve seat C.

D is a bore extending outward through the case and concentric to the annular seat C, being provided with a counter-bored portion E of slightly larger diameter.

F is an outwardly-extending nipple, having the passage G therein connecting with the counter-bore E.

H is an oppositely-extending nipple having the passage I connecting with the recess B.

J is a hollow cap having a threaded engagement with the wall of the recess B, serving to close the same.

K is a valve-stem fitting the bore D and extending at its outer end into operative relation to a lever L and at its inner end terminating adjacent to the seat C.

M is a valve disk having the central portion N for bearing against the inner end of the stem K, and provided with a surrounding annular groove O in which is placed a compressible gasket P of rubber or other resilient material.

Q is a spring within the recess in the cap J bearing against the lower face of the disk M.

With the construction as described the resilient pressure of the spring Q will normally hold the disk M in a position where the compressible resilient gasket P is against the valve seat C, so as to form an air tight seal. When, however, the lever L is operated the stem K will force the valve disk from its seat, permitting the air which enters through the passage I of the nipple H to the recess B, to pass into the counter-bore E, and thence through the passage G to the point of discharge. During this operation the back pressure exerted upon the valve disk by the air as well as the pressure of the spring must be overcome by the pressure of the stem K, but inasmuch as this stem bears against the metallic center portion N of the disk it will unseat the valve without injury to the gasket. On the other hand, the gasket will be forced by the air pressure against the annular seat C whenever the handle L is released, and this will form an air-tight seal.

What I claim as my invention is:—

1. A valve comprising a casing recessed to form a cylindrical chamber threaded to receive a plug, the bottom of said chamber being formed with an annular valve seat and the casing being formed with an aperture extending from said valve seat to the opposite side of the casing, said aperture being counterbored adjacent the valve seat, nipples oppositely projecting from said casing respectively formed with parallel bores having an offset relation, one of said bores communicating with the counterbored portion of said aperture and the other with said chamber, a valve disk fitted in said chamber for engagement with said seat, having a guiding engagement with the chamber wall and having a central bearing portion and a surrounding annular recess, a valve stem having an air-tight sliding fit in said aperture of the casing bearing loosely with one end against the central portion of the valve and projecting from the casing at its other end, a spring housed within said plug bearing against said valve to seat the same, and a lever pivoted upon the casing to bear upon the outer end of said valve rod for unseating the valve.

2. A valve comprising a casing recessed to form a cylindrical chamber threaded to receive a plug, the bottom of said chamber being formed with an annular valve seat and the casing being formed with an aperture extending from said valve seat to the opposite side of the casing, said aperture being counterbored adjacent the valve seat, nipples projecting from said casing, one of said nipples communicating with the counterbored portion of said aperture and the other having a passage communicating with said chamber, a valve disk fitted in said chamber for engagement with said seat, having a guiding engagement with the chamber wall and having a central bearing portion and a surrounding annular recess, a valve stem having an air-tight sliding fit in said aperture of the casing bearing loosely with one end against the central portion of the valve and projecting from the casing at its other end, a spring housed within said plug bearing against said valve to seat the same, and means exteriorly carried by the casing for exerting pressure upon the outer end of said stem to actuate said valve.

In testimony whereof I affix my signature in presence of two witnesses.

WILLIAM H. LUHRS.

Witnesses:
JAMES P. BARRY,
ARTHUR D. PULVER.

Copies of this patent may be obtained for five cents each, by addressing the "Commissioner of Patents, Washington, D. C."